United States Patent [19]
Watanabe et al.

[11] Patent Number: 5,043,402

[45] Date of Patent: Aug. 27, 1991

[54] POLYALKYLENE ARYLATE RESIN COMPOSITION

[75] Inventors: Junji Watanabe, Kanagawa; Tatsuya Saito; Toshio Nakane, both of Fuji; Kenji Hijikata, Mishima, all of Japan

[73] Assignee: Polyplastics Co., Ltd., Osaka, Japan

[21] Appl. No.: 501,082

[22] Filed: Mar. 29, 1990

[30] Foreign Application Priority Data

Mar. 31, 1989 [JP] Japan ................................. 1/80278

[51] Int. Cl.$^5$ .............................................. C08L 67/02
[52] U.S. Cl. .................................... 525/444; 525/448
[58] Field of Search .......................................... 525/444

[56] References Cited

U.S. PATENT DOCUMENTS 4,840,984 6/1989 Somemiya ........................... 525/444

Primary Examiner—Patricia Short
Attorney, Agent, or Firm—Nixon & Vanderhye

[57] ABSTRACT

Polyalkylene arylate resin compositions include a crystalline polyalkylene arylate base resin and a copolyester comprised of a polyalkylene arylate segment which exhibits smectic liquid crystallinity, and a polyalkylene arylate segment which does not exhibit smectic liquid crystallinity. Improved crystallization rates, and thus faster mold cycle times (i.e. increased productivity), ensue from the compositions of this invention.

5 Claims, No Drawings

POLYALKYLENE ARYLATE RESIN COMPOSITION

FIELD OF THE INVENTION

The present invention relates to a resin composition which exhibits improved crystallization rates during processing (resulting in higher productivity), and from which molded articles having excellent surface characteristics can be made.

BACKGROUND AND SUMMARY OF THE INVENTION

During the injection or extrusion molding of a crystalline thermoplastic polyalkylene arylate resin (e.g. as represented by polyalkylene terephthalate), the rate of crystallization of the resin when cooled has a great influence on the molding time (molding cycle time), and thus influences the productivity (economic efficiency) relating to making molded articles from such resin. Known methods for accelerating the crystallization rate by raising the crystallization temperature include adding an inorganic filler, such as boron nitride or talc, to the polyalkylene arylate resin. However, when a crystalline thermoplastic polyalkylene arylate resin containing such a filler is extruded into a film, small spots (called "fish eyes" in art parlance) will be present in the film presumably due to the nonuniform rate of crystallization that ensues. The resulting film is understandably of little commercial value. In order to solve this problem, the mixture comprised of crystalline thermoplastic polyalkylene arylate resin and inorganic filler must be further processed (i.e., the mixture must be subjected to high shearing force in an extruder for prolonged time periods) to thereby convert the mixture into a homogeneous dispersion. Such further processing, however, lowers the molecular weight of the resin in many cases yielding molded articles having poor physical characteristics.

The present invention is thus directed towards a solution to the above-described problems. More specifically, the present invention is based upon the discovery that, by adding a specific copolymer comprised of a specific alkylene arylate segment exhibiting smectic liquid crystallinity, and an ordinary polyalkylene arylate segment not exhibiting smectic liquid crystallinity, to a crystalline polyalkylene arylate base resin, significant improvements in the crystallization rate can be obtained. In addition, the problems associated with conventional techniques to improve crystallization rates (e.g. so-called "fish eyes" in formed films) are overcome.

DETAILED DESCRIPTION OF THE PREFERRED EMBODIMENTS

Broadly, the present invention relates to a polyalkylene arylate resin composition comprising (A) 100 parts by weight of a crystalline polyalkylene arylate base resin, and (B) 1 to 100 parts by weight of a copolyester comprising (a) a polyalkylene arylate segment which comprises repeating units represented by the general formula:

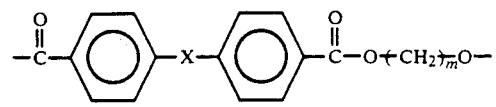

wherein X if present, is selected from the group consisting of

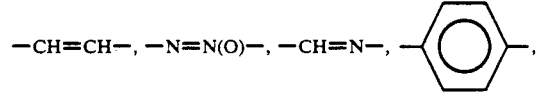

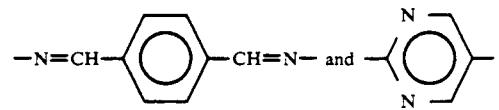

and, if X is absent, then the aryl moieties in Formula (1) are directly linked via a single bond; m is 4 to 10; and which exhibits smectic liquid crystallinity in and of itself (hereinafter sometimes referred to as the "LC segment") and (b) a polyalkylene arylate segment which comprises repeating units represented by the general formula $$-\overset{O}{\overset{\|}{C}}-Ar-\overset{O}{\overset{\|}{C}}-O-R-O- \qquad (2)$$

wherein Ar is

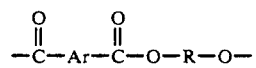

R is selected from an alkylene group,

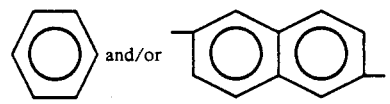

and wherein the segment of general formula (2) does not exhibit smectic liquid crystallinity in and of itself (hereinafter sometimes referred to as the "non-LC segment").

The crystalline polyalkylene arylate base resin which is the main component of the composition according to the present invention is preferably a polyester prepared by the polycondensation of terephthalic acid and/or naphthalenedicarbocylic acid (or an ester-forming derivative thereof) with alkylenediol (or an ester-forming derivative thereof). The diol component includes not only $-O-(CH_2)_{n'}-O-$ (where n' is an integer between 2 and 10, inclusive) but also cyclohexanediol and diethylenecyclohexanediol.

Representative examples of the polyalkylene arylate base resin include polyethylene terephthalate, polypropylene terephthalate, polybutylene terephthalates, polyhexamethylene terephthalate, polycyclohexane terephthalate, polycyclohexanedimethyl terephthalate and polyesters of the diol components of the above polyesters with naphthalenedicarboxylic acid, isophthalic acid and mixtures thereof.

The copolyester component (B) that may be used in the compositions of the present invention is a copolyester comprising both a LC segment (i.e. represented by the general Formula (1)) and a non-LC segment (i.e., represented by the general Formula (2)).

As described in, for example, Shigeo Iwayanagi, "Ekisho (Liquid Crystals)" (1984, Kyoritsu Shuppan) (expressly incorporated hereinto by reference), a smectic liquid crystal has a laminar structure wherein laminae are each comprised of molecules arranged in such a state that the axes of the molecules are parallel to each other, and the laminae are nearly perpendicular to the axes of the molecules, with the centers of gravity of the laminae being present on the same plane. Further, it is also known that a smectic liquid crystal exhibits a unique pattern such as batonets, mosaic or fan texture, when observed under a microscope with crossed nicols.

A smectic liquid crystalline segment exhibiting such unique characteristics must contain both a mesogen having a high stiffness and a soft spacer which is a flexible group in the same molecule thereof. That is, as represented by the general formula (1), the smectic liquid crystalline segment (a) must contain in its molecular skeleton both a mesogen containing at least two benzene rings, and a soft spacer composed of an alkyl group.

A particularly preferable example of the LC segment (a) is polyalkylene biphenylcarboxylate comprising repeating units represented by the general formula (1)-1:

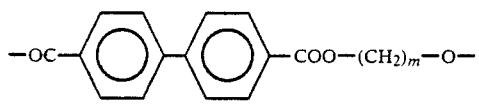

(1)-1 where m is an integer between 4 and 10, inclusive.

If the number of carbon atoms, m, of the soft spacer is less than 4, the resulting polymer will neither exhibit smectic liquid crystallinity nor have a latent ability to become a smectic liquid crystal. On the contrary, as the number of carbon atoms increases, the melting point of the resulting polymer will serve to accelerate the crystallization in the crystalline polymer.

The component (B) is a copolymer having in its not only a LC segment (a) as described above (i.e., which exhibits smectic liquid crystallinity in and of itself), but also another polyalkylene arylate segment (b) not exhibiting smectic liquid crystallinity. The non-LC segment (b) is represented by the general formula (2). Although any conventional polyalkylene arylate may be used as the non-LC segment (b), polyalkylene terephthalate and polyalkylene napthoate are preferred. Particularly preferred are polyalkylene terephthalates and polyalkylene napthoates having an alkyl group containing 2 to 10, particularly 2 to 4, carbon atoms.

The relation between the structures of the non-LC segment of the component (B) and the crystalline polyalkylene arylate (a) is not particularly limited. Thus, the structures of the non-LC segment (b) and the crystalline polyalkylene arylate may be the same as, or different from, one another. However, in order to facilitate the homogeneous dispersion of the components (A) and (B) to thereby obtain a molded article of high quality (e.g. free from so-called "fish eye" defects), it is preferred that the non-LC segment and the crystalline polyalkylene arylate have the same structures.

It is necessary from the standpoint of crystallization acceleration that the molar fraction of the smectic liquid crystalline segment (a) in the component (B) be between 10 to 90 mole %, and particularly between 30 to 90 mole %. The component (B) may or may not exhibit, in and of itself, smectic liquid crystallinity. That is, the benefits of the present invention can be achieved provided that the copolyester component (B) contains a segment in its molecular chain which in and of itself exhibits smectic liquid crystallinity and provided that that liquid crystal segment is present in the molecular chain in an amount as described above.

The copolyester component (B) can be prepared by melt-kneading a homopolymer solely composed of units represented by the general formula (1) with a homopolymer solely composed of units represented by the general formula (2) in the presence of a suitable ester interchange catalyst to thereby obtain a copolyester containing segments derived from each said homopolymer. Alternatively, the copolyester component (B) can be prepared by melt-kneading biphenylenedicarboxylic acid (or an ester-forming derivative thereof), terephthalic acid and/or naphthalenedicarboxylic acid (or an ester-forming derivative thereof) and alkylenediol in the presence of a suitable polycondensation catalyst under polycondensation reaction conditions.

The amount of the copolyester component (B) to be added to 100 parts by weight of the polyalkylene arylate base resin is between 1 to 100 parts by weight and preferably between 4 to 60 parts by weight. If the amount added is less than 1 part by weight, no beneficial effect on the crystallization will be obtained. On the other hand, if the amount exceeds 100 parts by weight, the resulting composition will be highly viscous in a molten state and thereby be more difficult to process.

The resin compositions of the present invention may also contain additives which are conventionally added to thermoplastic or thermosetting resins depending upon the performance characteristics that may be required. Examples of such additives include stabilizers such as antioxidants and ultra-violet light absorbers; antistatic agents; flame retardants; auxiliary flame retardants; coloring agents such as dyes and pigments; lubricants and fibrous, powdery, granular and/or flaky fillers.

The resin compositions according to the present invention can be prepared by processes conventionally used to prepare synthetic resin compositions using conventional processing equipment. For example, the necessary components may be mixed and kneaded together and extruded with a single- or twin-screw extruder to obtain a molding pellet. During preparation, a part of the necessary components may be mixed, as a master batch, with a residual part thereof, followed by molding. Furthermore, in order to facilitate the dispersion and mixing of the necessary components, a part or the whole of the resins may be preliminarily ground, followed by mixing and melt extrusion.

The resin compositions of the present invention exhibit enhanced rates of crystallization, thereby resulting in shorter molding cycle times and increased productivity. The compositions can moreover be crystallized at a uniform rate in the absence of high shear forces and/or long residence times during blending to give a molded article exhibiting excellent surface appearance.

The compositions of the present invention having the above characteristics can be molded by injection or extrusion molding techniques into various film, sheet and fiber articles.

EXAMPLES

The present invention will be described in more detail by referring to the following non-limiting Examples.

EXAMPLE 1

Dimethyl terephthalate (DMT), dimethyl bibenzoate (DMDA) and 1,4-butanediol (1,4 BD) were fed into a hermetically closed reactor at a molar ratio of 0.4:0.6:1.5 and heated under a normal pressure in the presence of a tetrabutyl titanate catalyst to gradually raise the temperature from 140° C. to 200° C. so as to carry out ester interchange. The reaction mixture was melt-polymerized at 245° C. under a reduced pressure of 0.5 Torr for one hour. The product was removed from the reactor and cut to obtain polymer chips (B).

The obtained polymer was a copolymer comprising a segment

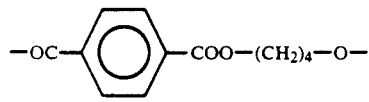

and a segment

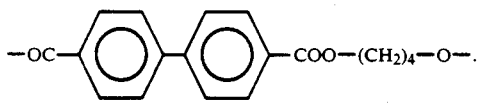

The copolymer exhibited smectic liquid crystallinity at 218° to 255° C., when observed under a microscope using a DSC manufactured by Parkin Elmer and crossed nicols.

10 parts by weight of the above polymer chips as the component (B) were added to 100 parts by weight of polybutylene terephthalate (A) having an intrinsic viscosity of 1.0 and the obtained mixture was kneaded by the use of a conventional extruder.

The resin composition thus prepared was cooled at a rate 10°, 40° or 100° C./min to determine the value (temperature) of the endothermic peak indicative of the rate of crystallization.

The resin composition was molded into a film by the use of an extruder fitted with a T-die and the surface appearance of the film was observed. The results are shown in Table 1. According to the present invention, a film having a uniform and smooth surface appearance was obtained.

EXAMPLE 2

Dimethyl terephthalate (DMT), dimethyl bibenzoate (DMDA) and 1,4-butanediol (1,4 BD) were fed into a hermetically closed reactor at a ratio of 0.3:0.7:1.5 and heated under a normal pressure in the presence of a tetrabutyl titanate catalyst to gradually raise the temperature from 140° C. to 210° C. Thus, the ester interchange was carried out. The reaction mixture was melt-polymerized at 260° C. under a reduced pressure of 0.5 Torr for 30 minutes. The product was taken out of the reactor and cut to obtain polymer chips (B).

Although the polymer (B) thus obtained comprised the same segments as those of the polymer obtained in Example 1, both the polymers are different from each other in the ratio between the segments. The polymer exhibited smectic liquid crystallinity at 226° to 245° C.

15 parts by weight of this copolymer was added to 100 parts by weight of polybutylene terephthalate (A) having an intrinsic viscosity of 1.0. The obtained mixture was kneaded by the use of a conventional extruder.

The obtained resin composition was examined for the value (temperature) of the endothermic peak indicating the rate of crystallization in a similar manner to that described in Example 1.

The resin composition was molded into a film by the use of an extruder fitted with a T-die and the surface appearance of the film was observed. The results are shown in Table 1.

EXAMPLE 3

Dimethyl terephthalate (DMT), dimethyl bibenzoate (DMDA) and 1,4-butanediol (1,4 BD) were polymerized at a molar ratio of 0.6:0.4:1.5 in a similar manner to that described in Example 1 to obtain a copolymer (B).

Although this copolymer was molten at 216° C., it did not exhibit smectic liquid crystallinity.

The preparation of a resin composition and the evaluation thereof were carried out according to the same procedure as that described in Example 1 except that the copolymer prepared in this Example as the component (B) was added to 100 parts by weight of the polybutylene terephthalate (A).

EXAMPLE 4

Dimehtyl terephthalate (DMT), dimethyl bibenzoate (DMDA) and 1,4-butanediol (1,4 BD) were fed into a hermetically closed reactor at a molar ratio of 0.2:0.8:1.5 and heated under a normal pressure in the presence of a tetrabutyl titanate catalyst to gradually raise the temperature from 140° C. to 210° C. Thus, the ester interchange was carried out. The resulting reaction mixture was melt-polymerized at 270° C. under a reduced pressure of 0.5 Torr for 20 minutes. The obtained product was taken out of the reactor and cut to obtain polymer chips.

The polymer (B) thus prepared comprised the same segments as those of the polymer prepared in Example 1 or 2, though they are different from each other in the ratio between the segments. The polymer exhibited smectic liquid crystallinity at 242° to 259° C.

15 parts by weight of this copolymer was added to 100 parts by weight of polyethylene terephthalate (A) having an intrinsic viscosity of 1.2. The obtained mixture was kneaded by the use of a conventional extruder.

The resin composition thus prepared was examined for the value of the endothermic peak indicating the rate of crystallization in a similar manner to that described in Examples 1 to 3.

The resin composition was molded into a film by the use of an extruder fitted with a T-die and the appearance of the film was observed. The results are shown in Table 1.

COMPARATIVE EXAMPLE 1

The same polybutylene terephthalate as that used in Example 1 was alone examined for crystallization temperature in a similar manner to that described in Example 1. Further, the polybutylene terephthalate was molded into a film by the use of an extruder fitted with a T-die and the surface appearance of the film was observed. The results are shown in Table 1.

COMPARATIVE EXAMPLE 2

The same polybutylene terephthalate as that used in Example 1 was kneaded together with 0.01% by width of powdered boron nitride (a product of Denki Kagaku Kogyo K.K.) by use of a conventional extuder to obtain ar esin composition. This resin composition was examined for crystallization temperature in a similar manner to that described in Example 1. Further, the resin composition was molded into a film with an extruder fitted with a T-die and the surface appearance of the film was observed. The results are shown in Table 1.

COMPARATIVE EXAMPLE 3

Dimethyl bibenzoate (DMDA) and 1,4-butanediol were fed into a hermetically closed reactor at a molar ratio of 1.0:1.5 and polycondensed in a similar manner to that described in Example 1 to obtain a homopolymer solely composed of repeating units:

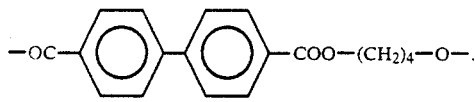

10 parts by weight of the homopolymer thus prepared was added to 100 parts by weight of PBT used instead of the component (B) of Example 1. The obtained mixture was kneaded and extruded to obtain a resin composition. This composition was evaluated in a similar manner to that described in example 1. The results are shown in Table 1.

COMPARATIVE EXAMPLE 4

The same polyethylene terephthalate as that used in Example 4 was examined for crystallization temperature in a similar manner to that described in Example 1. Further, the polyethylene terephthalate was molded into a film with an extrusion molding machine fitted with a T-die and the surface appearance of the film was observed. The results are shown in Table 1.

COMPARATIVE EXAMPLE 5

The same polyethylene terephthalate as that used in Example 4 was kneaded together with 0.01% by weight of powdered boron nitride (a product of Denki Kagaku Kogyo K.K.) by the use of a conventional extruder to obtain a resin composition. This resin composition was examined for crystallization temperature in a similar manner to that described in Example 1. Further, the resin composition was molded into a film with an extrusion molding machine fitted with a T-die and the surface appearance of the film was observed. The results are shown in Table 1.

As shown in Table 1, the composition of the present invention (of the Example) initiates crystallization at a higher temperature than that of the corresponding composition (of the Comparative Example), i.e., earlier than the corresponding composition. When the composition was cooled rapidly, the crystallization initiating temperature rose still remarkably. This rise in the crystallization initiating temperature means the enhancement of the rate of solidification (crystallization), practically shortening of the molding cycle.

TABLE 1

| | Composition | | | Characteristics | | | |
| | Component (A) | Component (B) | | endothermic peak value (°C.) | | | |
| | (pts. wt.) | molar ratio | (pts. wt.) | 10° C./min | 40° C./min | 100° C./min | fish eye |
|---|---|---|---|---|---|---|---|
| Ex. 1 | PBT (100) | DMT:DMDA:1,4 BD 0.4:0.6:1.5 | (10) | 186 | 174 | 162 | not observed |
| Ex. 2 | PBT (100) | DMT:DMDA:1,4 BD 0.3:0.7:1.5 | (15) | 189 | 178 | 165 | not observed |
| Ex. 3 | PBT (100) | DMT:DMDA:1,4 BD 0.6:0.4:1.5 | (20) | 185 | 172 | 159 | not observed |
| Ex. 4 | PET (100) | DMT:DMDA:1,4 BD 0.2:0.8:1.5 | (15) | 201 | 200 | 198 | not observed |
| Comp. Ex. 1 | PBT (100) | — | — | 184 | 170 | 155 | slightly observed |
| Comp. Ex. 2 | PBT (100) | (boron nitride) | (0.01) | 188 | 175 | 162 | observed |
| Comp. Ex. 3 | PBT (100) | DMDA:1,4 BD 1.0:1.5 | (10) | 185 | 173 | 160 | observed |
| Comp. Ex. 4 | PET | — | — | 199 | 196 | 194 | not observed |
| Comp. Ex. 5 | PET | (boron nitride) | (0.01) | 201 | 197 | 197 | observed |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A polyalkylene arylate resin composition comprising:
   (A) 100 parts by weight of a crystalline polyalkylene arylate base resin, and
   (B) 1 to 100 parts by weight of a copolyester comprised of:
      (a) between 10 to 90 mole % a polyalkylene arylate segment exhibiting smectic liquid crystallinity and having repeat units represented by the general formula:

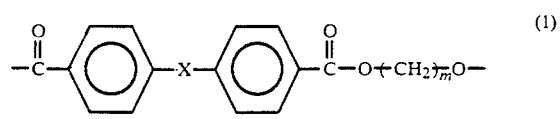

wherein X, if present, is selected from the group consisting of

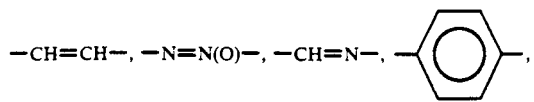

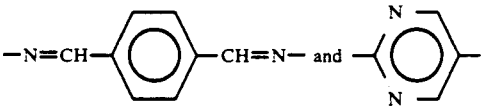

and m is 4 to 10; and (b) a polyalkylene arylate segment which does not exhibit smectic liquid crystallinity having repeat units represented by the general formula:

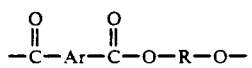

wherein Ar is

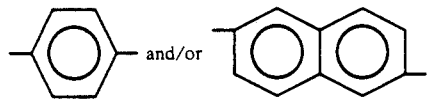

and R is selected from an alkylene group,

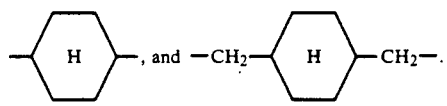

2. A polyalkylene arylate resin composition as in claim 1, wherein said crystalline polyalkylene arylate base resin is a polyester prepared by the polycondensation of one or more compounds selected from among ethylene glycol, propylene glycol, 1,4-butanediol hexamethylene glycol, cyclohexanediol and cyclohexanediethanol with terephthalic acid and/or naphthalenedicarboxylic acid.

3. A polyalkylene arylate resin composition as in claim 1, wherein R is at least one group selected from among $-(CH_2)_n-$, where n is an integer between 2 to 10, inclusive.

4. A polyalkylene arylate resin composition as in claim 1, wherein the molar ratio of said polyalkylene arylate segment (a) to said polyalkylene arylate segment (b) is between 10:90 and 90:10.

5. A molded article which consists essentially of the polyalkylene arylate resin composition as claimed in any one of claims 1–4.

* * * * *

UNITED STATES PATENT AND TRADEMARK OFFICE
CERTIFICATE OF CORRECTION

PATENT NO. : 5,043,402

DATED : August 27, 1991

INVENTOR(S) : WATANABE et al

It is certified that error appears in the above-identified patent and that said Letters Patent is hereby corrected as shown below:

Column 3, line 48, after "its" insert --structure--

Signed and Sealed this

Twenty-sixth Day of January, 1993

Attest:

STEPHEN G. KUNIN

*Attesting Officer*     *Acting Commissioner of Patents and Trademarks*